Jan. 31, 1950         J. D. BERRY              2,496,033
                      WASHING DEVICE
                   Filed Nov. 22, 1948
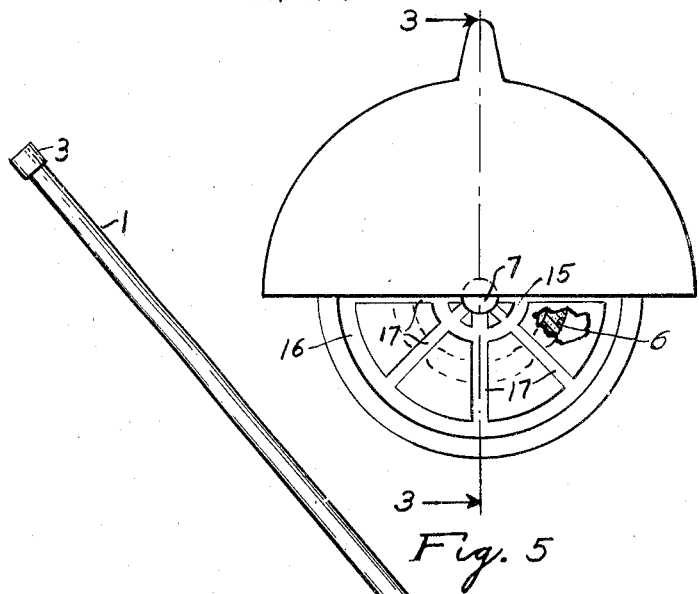
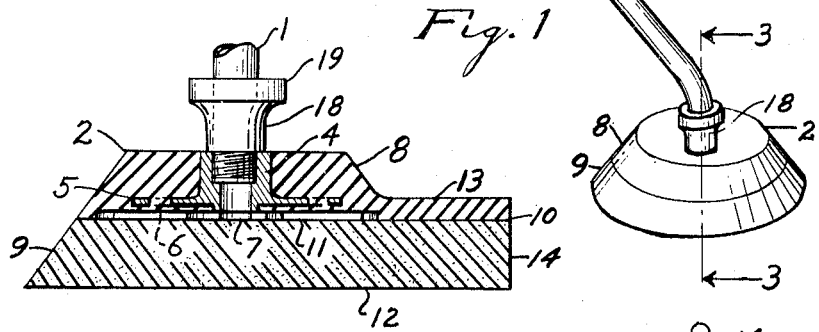
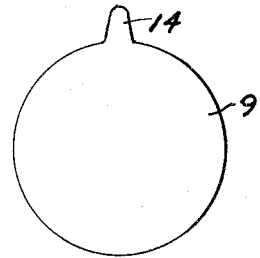
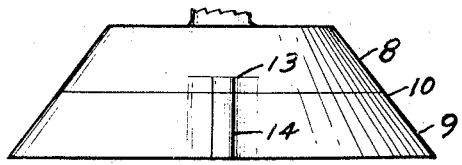
INVENTOR.
James D. Berry.
BY
Earl E. Moore
Atty.

Patented Jan. 31, 1950

2,496,033

UNITED STATES PATENT OFFICE 2,496,033

WASHING DEVICE

James D. Berry, Los Angeles, Calif.

Application November 22, 1948, Serial No. 61,369

5 Claims. (Cl. 15—130)

This invention relates to means and ways of providing a washing device which is adapted to work along surfaces that need cleaning, such as for instance, the surfaces of automobiles, trucks, railroad cars etc.

One of the principal objects is to present a hand operated washing device of the kind described which is convenient to handle, simple and durable in construction, inexpensive and economical to make and manufacture, and one that is compact, efficient in operation, and pleasing to the eye.

Another object is to provide a washer head which is made of a flexible rubber or rubber-like material that has molded therein a pipe coupling for conducting liquid, such as water, into the central portion of the head, the top portion of the head being non-porous to water so that all the water must pass through the lower portions of the head and against the surfaces to be cleaned.

Other objects, advantages and features of this invention will appear from a perusal of the accompanying drawings, the subjoined detailed description, the preamble of these specifications, and the appended claims.

Applicant is now about to describe one of the preferable forms of his invention in order to teach its use and construction, but it is to be understood that the drawings and description thereof are not to limit the invention in any sense whatsoever except as specifically limited by the appended claims.

In the drawings:

Figure 1 is a perspective view looking downwardly, and shows substantially the entire washing device;

Figure 2 is a bottom plan view of the head of washing device;

Figure 3 is an enlarged sectional view taken substantially along line 3—3 of Figures 1 and 5, with parts in elevation;

Figure 4 is an enlarged elevational view of just the head portion of the washer in order to better disclose the protrusion thereof.

Figure 5 is a bottom plan view with a portion broken away.

The washer comprises the handle portion 1 and the head portion 2 which are attached together preferably by a hose type coupling means. Although a rigid handle is illustrated, such a handle need not necessarily be used in that an ordinary garden hose, preferably the light weight small plastic variety, may be used so that an operator can hold the washer head 2 in his hand and manipulate it over the surface or surfaces to be cleaned. In washing the top of an automobile, for instance, the handle would be employed. The top end of the handle has the ordinary hose type coupling member 3, and the bottom end of the handle is threaded into the flanged coupling member 4.

The member 4 has the annular flange 5 which is provided with a plurality of openings 6; these openings being provided wholly for the purpose of lightening the weight of the flange and also for providing suitable spaces for the material of the head to enter in order to more securely hold the flanged member in place. This member is provided with the central bore 7 for the purposes of providing a duct for water or other liquid to pass.

The head of the washer is made of two parts, the top part 8 and the lower part 9, and these two parts are securely and everlastingly cemented together along their meeting surfaces indicated by the reference character 10. The top part is made of a non-porous semi-flexible material through which water will not pass and this material may be rubber or any other suitable material known in the plastic arts. Note, in particular, that the material of the top part envelopes the outer edge of the flange 5 because the material is molded around the flanged member 4 in order to be certain that the flange member will never become loose with respect to the top or bottom parts of the head, therefore, any amount of twisting will not in any way disposition the flange member in the head. The top part of the head is recessed to provide the disc-like chamber 11 so that the water entering same can quickly and easily spread over a large area of the lower part 9.

The lower part 9 is preferably sponge rubber or any other suitable material which is porous and flexible as the water must pass through this material as the lower surface 12 works along the surface to be washed in a sponge-like manner. This material must be soft in order not to damage smooth and polished surfaces. The chamber 11 is made purposely shallow so as not to hold much water so that the bottom part 9 can be dried quicker when required so as to lengthen its life.

The top and bottom parts 8 and 9 are provided with the protrusions 13 and 14 respectively; these protruded portions making it easy to clean inside corners and recessed parts of the surfaces being washed, which corners and recessed parts heretofore, especially on automobiles about the head lamps and fenders, required special attention with a cloth, rag, or sponge, as the washer head 9 was too large.

The chamber 11 consists of a series of grooves in the head portion 8, and none of these grooves are deep enough to prevent the rubber material of the head portion 8 from filling completely the openings 6 of the flange member 5; and enough material is provided on the bottom surface of the flange to insure fixed position of the flange member with the head portion 8. The grooves include the annular ones 15 and 16, as shown best in Figure 5, and these grooves are connected with the source of water supply in 7 by the radially directed grooves 17. This groove arrangement allows the water from duct 7 to enter the bottom head portion 9 at various well spaced points so as to make certain that the entire head portion 9 is thoroughly wetted including the outer perimeter portions thereof.

Cemented to the top of the head part 8, there is an upstanding tubular-like element 18 which has the top greater radius portion 19. When the handle 1 is employed, it is pushed through the bore of this element 18 and screwed securely into the flange member 4, but when it is desired to employ only the head itself without the handle, then the handle is removed and the end of a light weight hose screwed into the member 4 and the element 18 used between the fingers; thus the element 18 makes it easy to hold onto the head 2 without it slipping from the operator's hand. This element 18 may be made of soft rubber or of semi-soft rubber, or even of rigid material if thought desirable.

In view of the fact, that the two head portions 8 and 9 are securely cemented together and that the flange member 5 is molded into the head portion 8, there is no possible chance that any of these parts will become loose.

It is, of course, understood that various changes and modifications may be made in the details of form, style, design, and construction of the whole or any part of the specifically described embodiment of this invention without departing from the spirit thereof; such changes and modifications being within the scope of the following claims.

I claim:

1. In a washer device for cleaning surfaces, the device comprising a head having a non-porous top element and a porous bottom element integrated together, the bottom element having a bottom rubbing surface and a top flat surface of material size, the top element having a bottom flat surface of material size which is coincident with the top flat surface of the bottom element, a recessed portion in the top element opening to the bottom element, a coupling means for making connection with a source of liquid, the coupling means being embedded in the top element above the recessed portion and having means for engaging masses of material of the top element so that they are secured together to prevent loosening under torque conditions, and means for conducting liquid from the coupling means into the recessed portion.

2. The washer device recited in claim 1 wherein the porous bottom element has a narrowed portion which extends therefrom and which has a bottom rubbing surface in the same plane as the aforementioned rubbing surface for the purposes of washing in corners etc.

3. In a washer device for cleaning surfaces, a head having a non-porous top frusto-conical element and a porous frusto-conical bottom element which are integrated together and formed of soft pliable material, the bottom element having a flat rubbing surface and a top surface of material area and the top element having a bottom surface of material area which is coincident with the top surface of the bottom element and wherein the two elements form a frusto-conical shaped head, a shallow recessed portion in the top element which has its open side faced upon the top surface of the bottom element, a flanged tubular connecting means adapted to be connected with a source of liquid and having perforation means through which the material of the top element is molded in order to prevent loosening of the connecting means with the top element due to torque action.

4. The washer device recited in claim 3 wherein the top and bottom elements have coincident narrow extensions which present a narrow rubbing surface for reaching into corners.

5. The washer device recited in claim 3 wherein the recessed portion consists of a plurality of radially directed grooves in connection with a plurality of curved grooves, and a narrow rubbing surface extended from the bottom element which is in the same plane as the aforementioned rubbing surface.

JAMES D. BERRY.

REFERENCES CITED

The following references are of record in the file of this patent:

UNITED STATES PATENTS

| Number | Name | Date |
| --- | --- | --- |
| 467,778 | Clair | Jan. 26, 1892 |
| 656,301 | Pfeiffer | Aug. 21, 1900 |
| 1,334,911 | Lampkin | Mar. 23, 1920 |
| 2,061,219 | Wright | Nov. 17, 1936 |
| 2,281,484 | Ellinger | Apr. 28, 1942 |